United States Patent [19]

Charles

[11] Patent Number: 4,733,885

[45] Date of Patent: Mar. 29, 1988

[54] VEHICLE EQUIPPED WITH RETRACTABLE RELIEF SUPPORT WHEELS

[75] Inventor: Georges M. Charles, St Vallier, France

[73] Assignee: Potain Poclain Materiel (P.P.M.), Montceau-Les-Mines, France

[21] Appl. No.: 492,781

[22] Filed: May 9, 1983

[30] Foreign Application Priority Data

May 12, 1982 [FR] France ............... 82 08274

[51] Int. Cl.⁴ ........................... B62D 61/12
[52] U.S. Cl. ................... 280/767; 280/47.2; 280/755
[58] Field of Search ............ 280/762, 763.1, 764.1, 280/767, 43.13, 47.15, 47.2, 755; 180/24.02

[56] References Cited

U.S. PATENT DOCUMENTS

| | | | |
|---|---|---|---|
| 2,957,592 | 10/1960 | Thacker | 280/755 |
| 3,397,898 | 8/1968 | Denney et al. | 280/755 |
| 3,900,119 | 8/1975 | Olsen | 280/767 |
| 4,274,795 | 6/1981 | Taylor | 280/767 |

FOREIGN PATENT DOCUMENTS

| | | |
|---|---|---|
| 681497 | 9/1939 | Fed. Rep. of Germany . |
| 2843205 | 4/1979 | Fed. Rep. of Germany . |
| 48775 | 3/1938 | France . |
| 2421787 | 11/1979 | France . |
| 1002635 | 8/1965 | United Kingdom . |
| 1577310 | 10/1980 | United Kingdom . |

*Primary Examiner*—Richard A. Bertsch
*Attorney, Agent, or Firm*—Mason, Fenwick & Lawrence

[57] ABSTRACT

The invention relates to a vehicle comprising a chassis to which are coupled main wheels and relief wheels mounted on retractable supports and adapted either to increase the gauge of the main wheels of the vehicle, or to be retracted inside the width gauge of the chassis resting only on its main wheels. The main wheels are connected to the chassis by way of a soft suspension, whereas the left and right relief wheels are connected to their respective support by rigid elements only.

9 Claims, 6 Drawing Figures

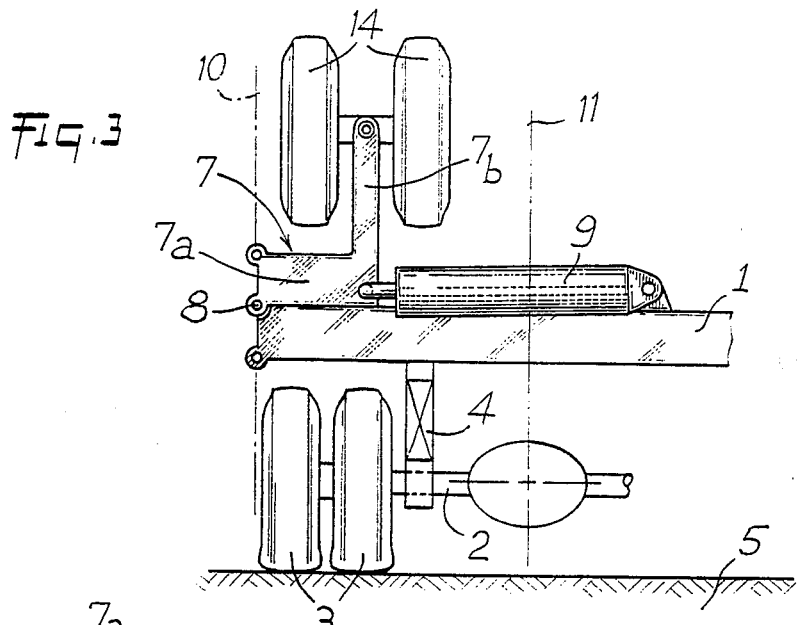
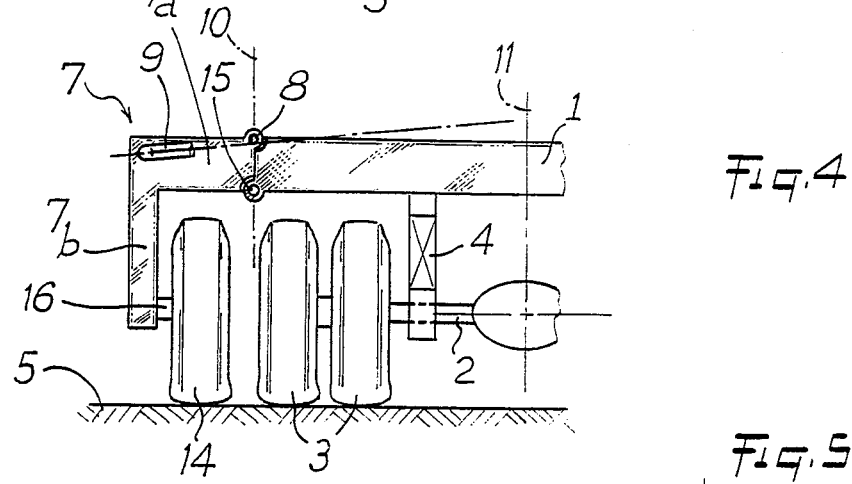
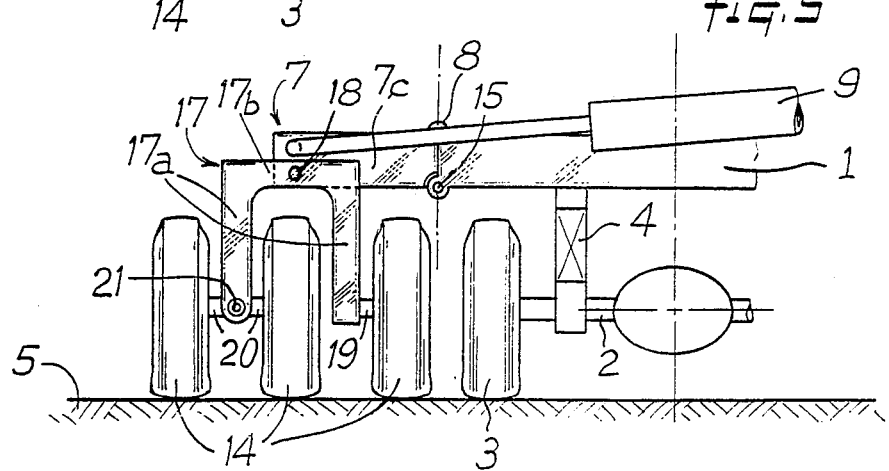

VEHICLE EQUIPPED WITH RETRACTABLE RELIEF SUPPORT WHEELS

The invention relates to a vehicle equipped with retractable relief support wheels.

In the field of heavy vehicles, such as certain movable and heavy handling machines, it is known to equip the vehicle with retractable relief support wheels, especially at the ends of the fixed rear axle. The machines thus equipped have axles with six to eight drive wheels instead of the usual four.

However, a number of disadvantages are noted, such as:

the necessity to adopt a strongly reinforced rear axle because of a greater eccentricity of the wheel assembly;

an increased width of the vehicle even when empty;

much skidding of the outer wheels of the rear axle, on corners, entailing important damaging of the road-surfaces.

Other types of machines are also known which are equipped with relief wheels which can be entirely retracted, when the vehicle is not moving, inside the road-covering structure of the vehicle. With these types of machines, the main wheels are secured on the chassis generally by way of fixed connections, whereas, on the contrary, the relief wheels which, when the vehicle is rolling are situated next to the main wheels and are at a greater distance from the median longitudinal vertical plane of the chassis than said main wheels, are equipped with a soft suspension. Such a machine presents certain advantages over the first type described hereinabove, but it has still one major disadvantage: in the configuration where the relief wheels are rolling on the ground, the outermost parts by which the machine rests on the ground, widthwise of the machine, are connected to the chassis by way of a soft suspension. The result is a bad lateral stability, the machine resting rockingly on the ground by its relief wheels.

It is the object of the present invention to overcome this state of affairs and, in the aforementioned application, to add in wheels which are not fixed drive wheels, but wheels which are idle in rotation, thus permitting:

to adopt standard non-reinforced rear axles;

to keep the width of the vehicle, when empty, equal to that of normal machines;

to limit skidding by mounting idle relief wheels; the motricity guaranteed by the four wheels of the normal rear axle being then perfectly adequate.

It should at this stage be noted that all the advantages afforded by the invention find other applications than with those vehicles equipped with a fixed rear axle as will be seen hereinafter.

The invention therefore relates to a vehicle comprising a chassis on which are mounted the main left and right wheels of at least one set of main wheels, and comprising also at least one set of left and right relief wheels mounted on supports, which supports are themselves mounted on the chassis and provided with means to adjust their position with respect to said chassis, and are adapted to occupy the two following positions:

a first position in which the left and right relief wheels are placed next to and beyond the median longitudinal plane of the chassis, said left and right main wheels being respectively placed in rolling configuration on the ground, the supports being also immobilized with respect to the chassis, and, a second position in which the said supports and the said relief wheels mounted therein, are substantially within the maximum width gauge of the chassis resting on the ground solely by its main wheels.

In this vehicle, the main wheels of said set of main wheels are connected to the chassis via a soft suspension, whereas the relief wheels of said sets of left and right relief wheels are only connected to their respective supports via rigid elements.

The following advantageous dispositions are also preferably adopted:

the soft suspension of the main wheels comprises operating cylinders, each one with its working chamber, the working chambers of the different cylinders being connected to a pressurized fluid accumulator;

the vehicle comprises a pump, whose delivery pipe is connected to said working chambers, the pressurized fluid accumulator being shunt-connected on said delivery pipe;

a non-return valve is fitted on the delivery pipe, between the pump and the connecting pipe of the pressurized fluid accumulator, to allow the flow of fluid from the pump towards the pressurized fluid accumulator;

each relief wheel support is mounted on the chassis, for pivoting about a longitudinal horizontal axis, and is coupled to a hydraulic operating cylinder provided for adjusting its position, said cylinder being interposed between said support and the chassis;

when a relief wheel support supports an odd number of relief wheels forming a set composed of an odd number of wheels, plus one separate wheel, the axis of rotation of said separate wheel is fixed with respect to said support;

when a relief wheel support supports at least one set of an even number of wheels, the relief wheels of said set are mounted on the same shaft, in two equal sub-sets, whereas said shaft is mounted for pivoting with respect to the support about a longitudinal horizontal axis situated between the wheels of said sub-sets;

the relief wheels are mounted for idle rotation on their support.

The invention will be more readily understood on reading the following description with reference to the accompanying drawings, in which:

FIG. 3 is similar to FIG. 1 and shows the same machine in a second in-service configuration;

FIGS. 4 and 5 are similar to FIG. 1 and show two variant embodiments according to the invention.

Figure 1:
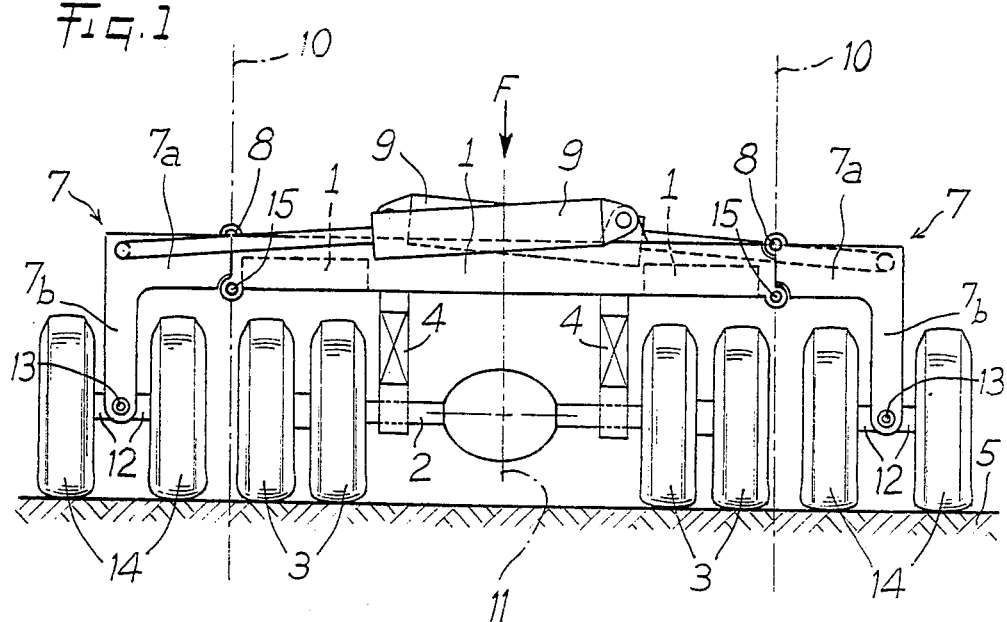
FIG. 1 is a front view along arrow G of FIG. 2 of a vehicle according to the invention in a first in-service configuration.

Referring first to FIGS. 1 to 4, these figures show a machine comprising a chassis 1, a fixed or rigid axle 2, at each end of which are rotatably mounted twin wheels 3, and a suspension 4 connecting the axle 2 to the chassis 1. Said wheels 3 are resting on the ground 5, and it should be noted that the suspension is of a known type, constituted for example by hydraulic operating cylinders which may be associated to springs. A main shaft 6 connects the axle 2 to a driving motor not shown.

The machine illustrated by way of example is a handling crane, the front wheels of which are precisely the drive wheels 3. Also to be noted is that the boom of said crane extends on the side of said wheels 3. The weight resting on the wheels, which varies with the work required from the crane, whether it supports a body during handling or no body at all, is unevenly distributed between the front and rear wheels. It is noted that the portion of the total weight resting on the front wheels 3 is in fact very variable, in a ratio which is equal to and even greater than 2:1.

The machine illustrated in FIGS. 1 to 4 further comprises two supports 7 in the shape of an upturned L mounted for pivoting on the chassis 1 about longitudinal horizontal pins 8 traversing the upper edge of the upper horizontal branch 7a of each support. One support 7 is arranged on each side of the chassis 1, each support being coupled to a fluid operating cylinder 9 (or like element) which controls its pivoting movement about the correspinding axis or pin 8, thus permitting a maximum pivoting movement over 180° placing the branch 7a in a horizontal position, either overhanging beyond the vertical longitudinal planes 10 which define the width gauge of the vehicle with respect to the longitudinal median plane 11 of said chassis (FIG. 1 and 2), or above the chassis 1, then placing the support 7 entirely inside said gauge (FIG. 3).

Figure 2:
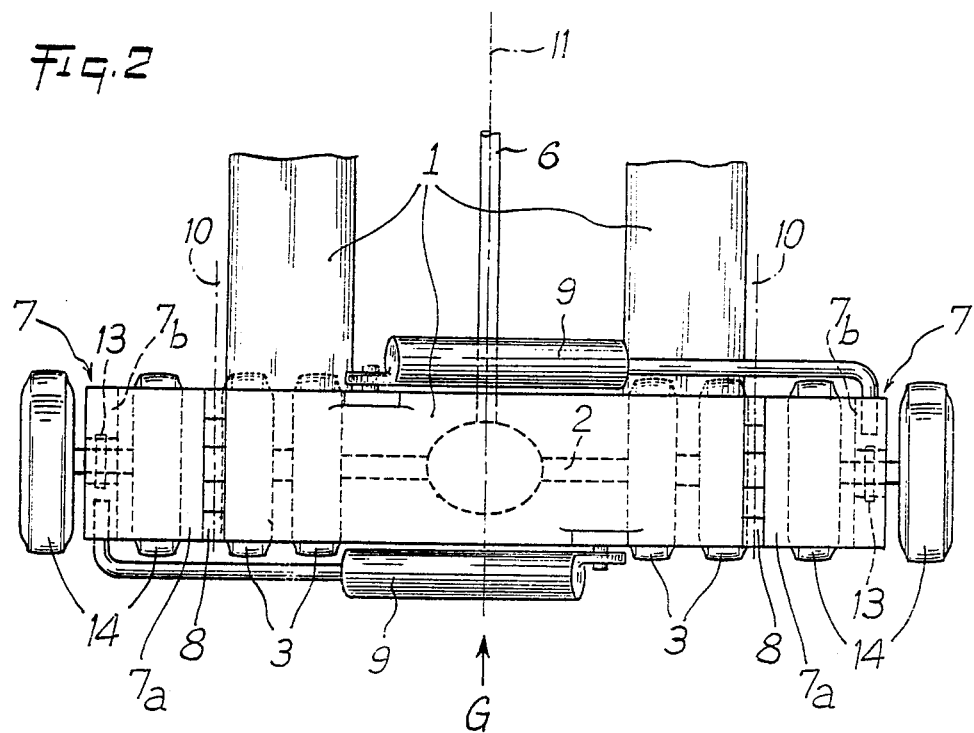
FIG. 2 is a plan view of the machine shown in FIG. 1, taken along arrow F of said figure.

According to the embodiment shown in FIGS. 1 and 2, a shaft 12 is mounted at the free end of the vertical branch 7b of each support 7, for limited rotation about a horizontal longitudinal pin 13. At the ends of said shaft 12 are rotatably mounted on either side of said branch 7b, two relief wheels 14, which are idle in rotation.

Said relief wheels 14 are thus placed, either next to the drive wheels 3 (FIGS. 1 and 2) and are held in firm contact with the ground 5 by operating cylinders 9 which lock each support 7 in position, or off the ground (FIG. 3) and thus above the chassis 1, between the planes 10 defining the vehicle gauge. It is to be noted that in the position where the relief wheels 14 are resting on the ground, a removable lock-pin 15 ensures that each support 7 is locked in position with the chassis 1.

The embodiment shown in FIG. 4 has mostly the same dispositions as already described hereinabove. The only difference with respect to the embodiment of FIGS. 1 to 3 is the presence on every support 7 of only one relief wheel 14 which is mounted for idle rotation on a section of shaft 16 which is itself fixedly mounted on the free end of the branch 7b of said support. But the same arrangement for adjusting and locking the supports 7 in position (operating cylinders 9, lock-pins 15) is also used, said supports being placed one on each side of the chassis 1, so that in the low position, the relief wheel 14 is placed next to the twin drive wheels 3.

The embodiment illustrated in FIG. 5 is also quite similar to the other two, although it differs from that illustrated in FIGS. 1 to 3 by the following points :

there are only two drive wheels 3, one on each side of the rear axle 2;

each support 7 is limited by a single horizontal arm 7 c, which is also mounted for pivoting with respect to the chassis 1, about pin 8;

there are, on the other hand, three relief wheels 14, mounted at the ends of the vertical branches 17a of a balancer 17 which is in the shape of an upturned U, and is mounted for pivoting with respect to the arm 7c, about a horizontal longitudinal pin traversing the horizontal branch 17b of the U through its middle. One of the relief wheels 14 is mounted for idle rotation on a shaft 19 fixedly mounted on the end of one of the two vertical branches 17a, whereas each one of the two relief wheels 14 is mounted for idle rotation on the ends of a shaft 20 which is itself mounted for limited rotation on the end of the other branch 17a via a horizontal longitudinal pin 21.

It is obviously possible, in the embodiment shown in FIG. 5 and in the configuration particularly illustrated in said figure, to place the relief wheels 14 next to each drive wheel 3.

Figure 6:
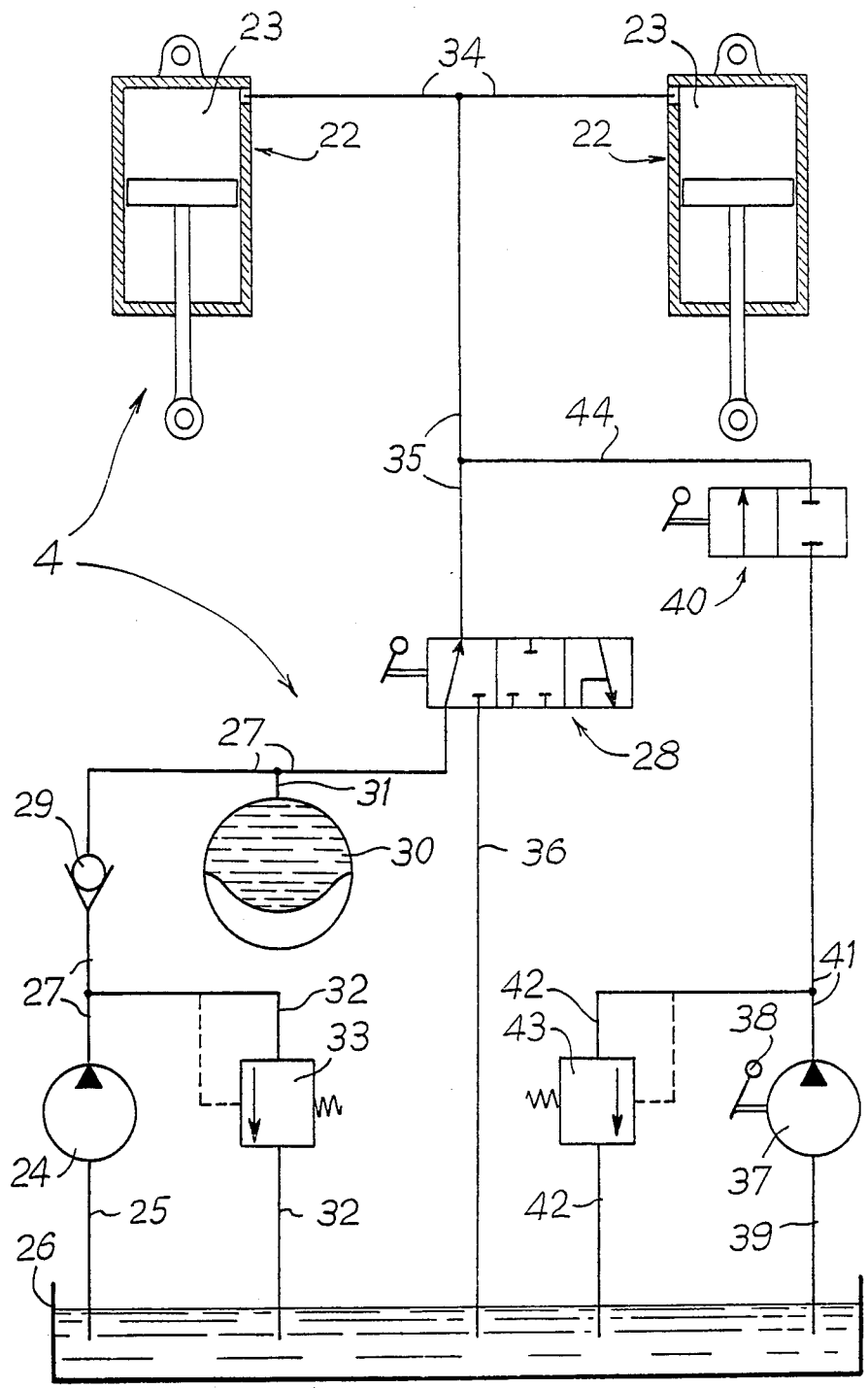
FIG. 6 is a diagram of the hydraulic circuit of a soft suspension connecting the main wheels to the chassis.

FIG. 6 shows in detail an embodiment of the suspension 4. This comprises:

two operating cylinders 22 coupled between the rear axle 2 and the chassis 1, each one comprising a working chamber 23, a main pump 24 connected via its induction pipe 25 to a fluid tank 26, and via its delivery pipe 27 to a three-position fluid control valve 28, a non-return valve 29 fitted on pipe 27 and allowing the flow of fluid from the pump 24 towards control valve 28, a pressurized fluid accumulator 30 connected via a pipe 31 to the part of the delivery pipe 27 situated between control valve 28 and non-return valve 29, a pipe 32, connecting the pipe 27, between the pump 24 and the non-return valve 29, to the tank 26, and on which a set discharge valve 33 is provided, a pipe 34, interconnecting the working chambers 23 of the two operating cylinders 22, a pipe 35 connecting the pipe 34 to control valve 28, a pipe 36, connecting said control valve 28 to the tank 26, an auxiliary pump 37 with hand control 38, which is connected to the tank 26 via its induction pipe 39 and to a two-position fluid control valve 40 via its delivery pipe 41, a pipe 42, connecting the pipe 41 to the tank 26 and equipped with a set discharge valve 43, and, a pipe 44, connecting control valve 40 to pipe 35.

The three positions of the control valve 28 correspond:

the first position, to pipe 27 communicating with pipe 35, and to the obturation of pipe 36;

the second position, to the obturation of pipes 27, 35 and 36; and, the third position, to pipes 27, 35 and 36 intercommunicating.

The two positions of control valve 40 correspond:

the first position, to the obturation of pipes 41 and 44; and the second position, to pipe 41 communicating with pipe 44.

The dispositions illustrated by way of example, present many advantages because when the vehicle is momentarily overloaded, it suffices to bring the relief wheels 14 in contact with the ground 5 for the total weight resting on the front wheels to be distributed, no longer on the drive wheels 3 only, but also on the relief wheels 14. Thus, the pressure of the tires on the ground can be kept to a value below that at which the ground surface starts being damaged.

It is to be noted that the fact of locking the supports 7 in position in this particular in-service configuration of the relief wheels 14, not only constitutes a safety disposition, but also results in the width of the vehicle supporting polygon being increased, which would not have been the case had the relief wheels been elastically suspended on the chassis 1. The lateral stability of the vehicle is therefore at a maximum and fully satisfactory.

The driving power continues to be adequately transmitted only to the drive wheels 3.

From this point of view, the adoption of a soft suspension for said wheels 3, such as illustrated in FIG. 6, is preferred. Indeed, when the control valves 28 and 40 are placed (as illustrated) in their first respective positions, the main pump 24 feeds pressurized fluid, at a pressure which is limited by discharge valve 33, to the pressurized fluid accumulator 30, whilst the non-return valve 29 prevents the fluid contained in working chambers 23 from flowing back towards the tank 26. Said fluid can thus be transferred from one chamber 23 towards the other chamber 23 and/or from one of these two chambers towards the pressurized fluid accumulator 30. The pressure of this fluid is substantially constant, so that the drive wheels 3 are kept in resting contact with the ground 5, resiliently although with a substantially constant pressure, the value of which is obviously adequately transmitted from the main shaft 6 to the drive wheels 3.

The other two positions of the control valve 28 permit either to lock the rear axle 2 with respect to the chassis 1, or to drain out the hydraulic circuit of the suspension.

Auxiliary pump 37 further permits to replace the main pump 24 in case of a breakdown and to supply the working chambers 23 and the pressurized fluid accumulator 30, when the control valve 40 is in its second position.

It can also be observed that the relief wheels 14, being situated in extension of the rear axle 2 but being idle in rotation, any skidding of these wheels will be negligible.

Moreover, said relief wheels being mounted, not on the ends of the rear axle 2, but on supports 7 separate from said rear axle, said latter is of a conventional standard type, and requires no reinforcement.

Finally, in the off-service configuration (FIG. 3) the relief wheels 14 and their supports 7 are situated outside the area defined by the planes 10, or in other words, the vehicle gauge remains the same as a vehicle which is not equipped with such relief wheels.

It is also possible to choose between one (FIG. 4), two (FIGS. 1 to 3), three (FIG. 5) or more pairs of relief wheels 14, depending on the anticipated variation of weight of the vehicle while in service.

The invention is in no way limited to the embodiments described hereinabove and on the contrary covers any variants that can be brought thereto without departing from the scope or the spirit thereof.

For example, the relief wheels 14 can also be adapted to vehicles of which the wheels 3 are not the drive wheels, or which are equipped with independent suspensions (one suspension per wheel 3 or per pair of dual wheels 3). Also, said wheels 14 could, as a variant, be drive wheels.

What I claim is:

1. A vehicle comprising a chassis on which are mounted the left and right main wheels of at least one set of main wheels, and comprising also at least one set of left and right relief wheels mounted on supports, said supports being mounted on the chassis and provided with means to adjust their position with respect to said chassis, and being adapted to occupy the two following positions:

a first position in which the left and right relief wheels are placed next to and beyond the median longitudinal plane of the chassis, said left and right main wheels being respectively placed in rolling configuration on the ground, the supports being also immobilized with respect to the chassis, and, a second position in which the said supports and the said relief wheels mounted therein, are substantially within the maximum gauge of the chassis resting on the ground solely by its main wheels, wherein the main wheels of said set of main wheels are connected to the chassis via a soft suspension, whereas the relief wheels of said sets of left and right relief wheels are only connected to their respective supports via rigid elements.

2. Vehicle as claimed in claim 1, wherein the soft suspension of the main wheels comprises operating cylinders, each one with its working chamber, the working chambers of the different cylinders being connected to a pressurized fluid accumulator.

3. Vehicle as claimed in claim 2, wherein said vehicle comprises a pump whose delivery pipe is connected to said working chambers, the pressurized fluid accumulator being shunt-connected on said delivery pipe.

4. Vehicle as claimed in claim 3, wherein a non-return valve is fitted on the delivery pipe, between the pump and the connecting pipe of the pressurized fluid accumulator, to allow the flow of fluid from the pump towards the pressurized fluid accumulator.

5. Vehicle as claimed in claim 1, wherein each relief wheel support is mounted on the chassis for pivoting about a longitudinal horizontal axis, and is coupled to a hydraulic operating cylinder provided for adjusting its position, said cylinder being interposed between said support and the chassis.

6. Vehicle as claimed in one of claims 1 to 5, wherein the relief wheels are mounted for idle rotation on their supports.

7. Vehicle as claimed in claim 1, wherein each relief wheel support supports an odd number of relief wheels forming a set of an odd number of wheels, plus one separate wheel, the axis of rotation of said separate wheel being fixed with respect to said support.

8. Vehicle as claimed in claim 7, wherein each relief wheel support supports at least one set of an even number of wheels, the relief wheels of said set being mounted on the same shaft in two equal sub-sets, whereas said shaft is mounted for pivoting with respect to the support about a longitudinal horizontal axis situated between the wheels of said two sub-sets of wheels.

9. Vehicle as claimed in claim 1, wherein each relief wheel support supports at least one set of an even number of wheels, the relief wheels of said set being mounted on the same shaft in two equal sub-sets, whereas said shaft is mounted for pivoting with respect to the support about a longitudinal horizontal axis situated between the wheels of said two sub-sets of wheels.

* * * * *